United States Patent
Lopez et al.

(10) Patent No.: US 12,230,912 B2
(45) Date of Patent: Feb. 18, 2025

(54) HYGIENIC ELECTRICAL FITTING WITH SEAL MEMBERS

(71) Applicant: ABB Schweiz AG, Baden (CH)

(72) Inventors: Omar Alfredo Lopez, Nesbit, MS (US); Jeffery John Battani, Waterford, WI (US); Jacob Stewart Caldwell, Memphis, TN (US)

(73) Assignee: ABB Schweiz AG, Baden (CH)

( * ) Notice: Subject to any disclaimer, the term of this patent is extended or adjusted under 35 U.S.C. 154(b) by 460 days.

(21) Appl. No.: 17/669,028

(22) Filed: Feb. 10, 2022

(65) Prior Publication Data

US 2023/0253729 A1 Aug. 10, 2023

(51) Int. Cl.
*H01R 13/52* (2006.01)
*F16L 19/065* (2006.01)
*F16L 33/18* (2006.01)
*H02G 3/06* (2006.01)

(52) U.S. Cl.
CPC ........ *H01R 13/5219* (2013.01); *F16L 19/065* (2013.01); *F16L 33/18* (2013.01); *H02G 3/0675* (2013.01)

(58) Field of Classification Search
CPC .... H01R 13/5219; F16L 19/065; F16L 33/18; H02G 3/0675; H02G 3/0666; H02G 3/088
USPC ....................................................... 439/271
See application file for complete search history.

(56) References Cited

U.S. PATENT DOCUMENTS

| 7,183,486 B2 * | 2/2007 | Pyron ................ H01R 13/5219 174/59 |
| 8,910,980 B2 | 12/2014 | Neal et al. |
| 11,774,029 B2 * | 10/2023 | Danneffel .............. B65D 59/06 138/96 T |
| 2008/0143103 A1 * | 6/2008 | Kiely .................... F16L 19/075 285/151.1 |
| 2009/0179388 A1 * | 7/2009 | Uhlenkamp ............ F16L 23/22 277/612 |
| 2010/0084855 A1 | 4/2010 | Evans |
| 2012/0074694 A1 * | 3/2012 | Butte ...................... F16L 23/12 277/609 |
| 2014/0145436 A1 * | 5/2014 | Charcenko ................ F16L 5/06 285/355 |

(Continued)

FOREIGN PATENT DOCUMENTS

DE 202010006985 U1 8/2010

*Primary Examiner* — Abdullah A Riyami
*Assistant Examiner* — Amara Anderson
(74) *Attorney, Agent, or Firm* — McCarter & English, LLP; Michael M. Gnibus

(57) ABSTRACT

A liquid-tight fitting includes a connector, a seal, and a fastener member. The connector has a first and a second end, a shoulder located between the first and second ends, and a segment that extends from the shoulder to the first end. The segment has an outer surface. The seal has an inner surface in contact with the outer surface of the segment, an outer edge, and first and second seal ends joining the inner surface and the outer edge. The seal surrounds a portion of the segment such that the first seal end abuts against the shoulder. The fastener member is moveably secured to the first end of the connector, and has an end that engages the second seal end to cause the seal to compress between the shoulder and the fastener member. The seal member is adapted to deform toward the segment when compressed.

18 Claims, 18 Drawing Sheets

(56) References Cited

U.S. PATENT DOCUMENTS

2017/0030495 A1* 2/2017 Williams .............. F16L 19/103
2020/0232560 A1   7/2020 Uhlenkamp et al.
2021/0364108 A1   11/2021 Buck et al.

* cited by examiner

HYGIENIC ELECTRICAL FITTING WITH SEAL MEMBERS

BACKGROUND

The field of the disclosure relates generally to electrical fittings and, more particularly, to a seal apparatus for converting a standard liquid-tight fitting to a hygienic liquid-tight fitting for use in a splash-zone or wash-down environment.

Electrical fittings are well-known for their frequent use for connecting a terminal end of an electrical conduit to an electrical device such as, for example, an electrical panel or a junction box. Certain electrical fittings, such as liquid-tight electrical fittings, are designed to prevent liquid, such as water, from entering the conduit and damaging the conductors located in the conduit and associated established electrical connections formed by the conductors. Some known liquid-tight electrical fittings connecting electrical devices and conduits use a gland nut to secure the electrical conduit and connector. In such known fittings, a grounding cone is positioned within the hollow connector interior and the grounding cone produces a liquid-tight seal with the conduit and also serves as a means for providing grounding protection for the electrical components located in the conduit and the electrical device. An insulating member may be positioned in the liquid-tight electrical fitting at one or both ends of the grounding cone. The material comprising the grounding cone and/or insulating member frequently protrudes outward beyond the open ends of the connector body. In such applications requiring a liquid-tight seal, as the gland nut or other fastener is threadably connected to the connector the material protruding from the connector ends is wedged between the gland nut and connector body and fills a space therebetween. The gland nut or fastener is prevented from being completely threadably fastened onto the connector. As a result, connector threads are not completely covered by the gland nut or fastener body and are exposed during associated system use.

Frequently, liquid-tight electrical fittings are used in manufacturing areas that require a high level of cleanliness. For product manufacturers in the pharmaceutical and food and beverage industries, the industries' greatest priority is the elimination or reduction of contamination of manufactured products and pharmaceuticals. During production, product or intermittent cleaning solution may routinely escape production equipment, creating a "splash-zone" within the vicinity of the product being produced. Moreover, areas near production equipment are routinely washed down by operators to remove potentially harmful contaminants. Liquid-tight electrical fittings used within a splash-zone and wash-down environment must meet strict hygienic design requirements of specialized standards such as NSF 169 and EN 1672-2. Typically, standard liquid-tight fittings do not meet these requirements. One reason for this is that the exposed threads on these standard liquid-tight fittings provide small crevices for liquid to settle. The small crevices of the exposed threads attract and enable harmful microbes and other contaminants to collect along the threaded surfaces, and these small crevices are otherwise difficult to completely sanitize.

Known liquid-tight fittings that are used in splash-zone and wash-down environments are therefore highly specialized to eliminate exposed threaded areas and meet hygienic design requirements. These specialized fittings are typically significantly more expensive than standard fittings. In addition, these specialized fittings include parts that are not readily interchangeable with off-the-shelf parts. In contrast, parts of the standard liquid-tight electrical fitting, such as the connector and gland nut, are interchangeable and readily available parts.

Accordingly, there is a need to provide a hygienic electrical fitting that overcomes the challenges of existing, specialized fittings. In particular, it would be advantageous to provide a seal apparatus that converts a standard electrical fitting to a hygienic electrical fitting for use in a splash-zone or wash-down environment.

BRIEF DESCRIPTION

In one aspect, a liquid-tight fitting is provided. The liquid-tight fitting includes a connector, a seal member formed of an elastically deformable material, and a fastener member. The connector has a first end, a second end, a shoulder located between the first end and the second end, and a first segment that extends from the shoulder to the first end. The first segment has an outer surface. The first seal member surrounds a portion of the first segment adjacent the shoulder, and has an inner surface in contact with the outer surface of the first segment, an outer edge opposite the inner surface, and first and second seal ends that join the inner surface and the outer edge, where the first seal end abuts against the shoulder. The fastener member is moveably secured to the first end of the connector, and has an end that engages the second seal end to cause the first seal member to form a compressive seal between the shoulder and the fastener member. The first seal member is adapted to deform toward the first segment when the end of the fastener member engages the second seal end.

In another aspect, a liquid-tight fitting is provided. The liquid-tight fitting includes a connector, a ground cone, a first seal member, a gland nut, and a second seal member. The connector has a first end adapted to receive a conduit, a second end adapted to attach to an electrical enclosure, a central bore that extends therethrough, a shoulder located between the first end and the second end, a first segment that extends from the shoulder to the first end, and a second segment that extends from the shoulder to the second end. The ground cone is positioned within the central bore at the first end of the connector. The first and second seal members are formed of an elastically deformable material. The first seal member surrounds a portion of the first segment adjacent the shoulder. The second seal member surrounds a portion of the second segment adjacent the shoulder. The gland nut is moveably secured to the first end of the connector, and has an end that engages the first seal member to cause the first seal member to form a compressive seal between the shoulder and the gland nut. The second seal member is adapted to form a compressive seal between the shoulder and the electrical enclosure.

In yet another aspect, a method for assembling a liquid-tight fitting is provided. The method includes providing a connector that has a first end, a second end, a shoulder located between the first end and the second end, and a first segment that extends from the shoulder to the first end. The method also includes placing a seal member around the first segment, where the seal member has first and second seal ends joining an inner surface and an outer edge of the seal member, and where the seal member is placed around the first segment so that the first seal end abuts against the shoulder and the inner surface is in contact with the first segment. The method further includes moveably securing a fastener member to the first end of the connector such that an end of the fastener member engages the second seal end to cause the seal member to form a compressive seal between the fastener member and the shoulder, where the seal member deforms toward the first segment when the fastener member engages the second seal end.

DETAILED DESCRIPTION

Figure 1:
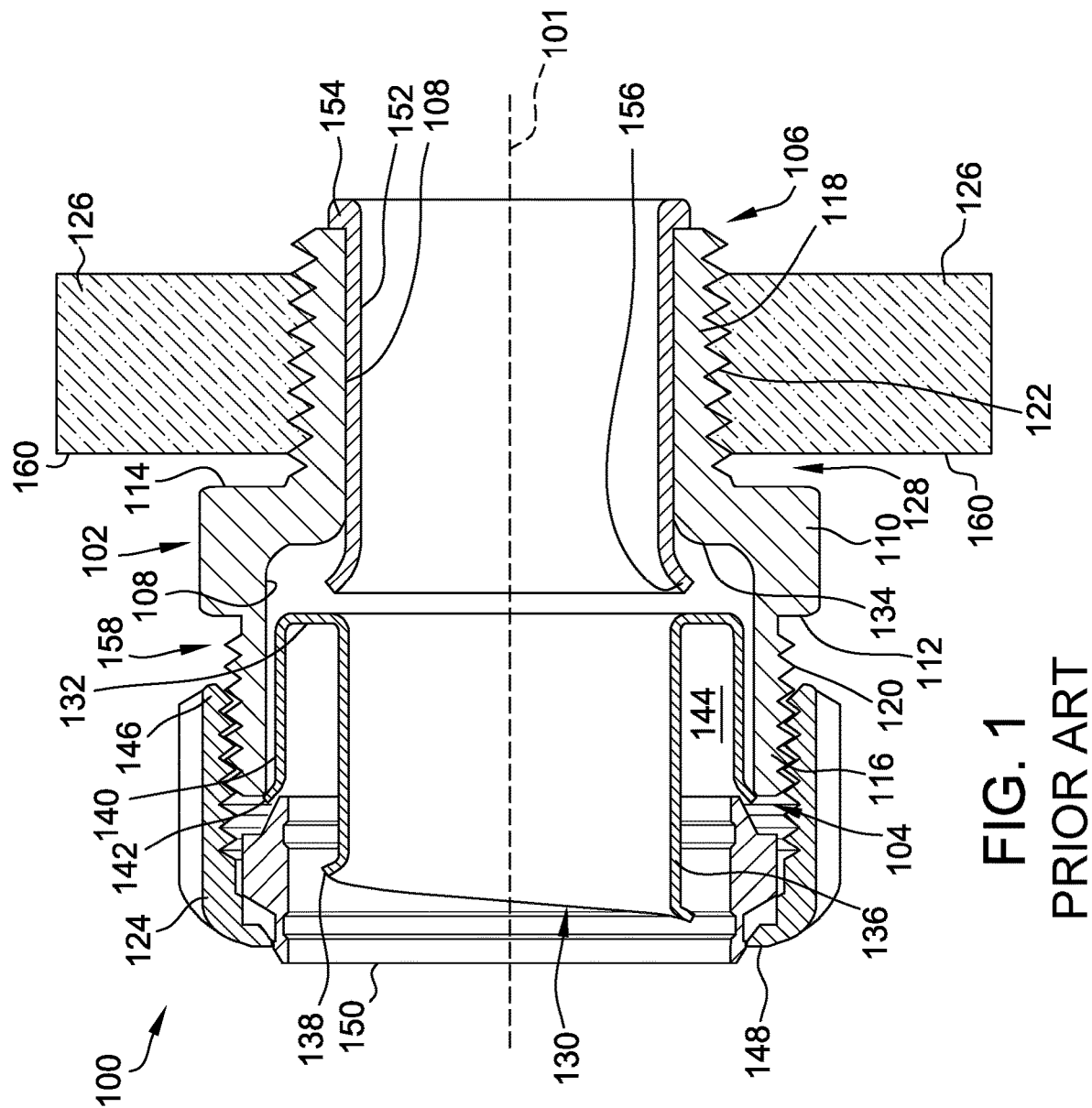
FIG. 1 is a longitudinal cross-sectional view of a liquid-tight fitting.

FIG. 1 shows a longitudinal cross-sectional view of a liquid-tight fitting 100. As used herein, the term "fitting" generally refers to an electrical coupling element that is used to connect insulated cables or conduits to electrical enclosures such as an electrical panel, a junction box, or the like. The modifier "liquid-tight" generally refers to a fitting that maintains the liquid-tight integrity of the conduit at the point where the conduit is connected to the electrical enclosure. A liquid tight fitting is a fitting that includes a means for preventing the undesirable flow of liquid into the interior of the fitting.

Liquid-tight fitting 100 includes a connector 102 that has a longitudinal axis 101, a first connector end 104, and a second connector end 106. Connector 102 is open at both ends 104 and 106 and has a central bore 108 extending therethrough. Connector 102 also has a shoulder 110 located between first connector end 104 and second connector end 106. Shoulder 110 extends circumferentially and radially outwardly along the exterior of connector 102. Shoulder 110 has a first radial surface 112 directed toward first connector end 104 and a second radial surface 114 directed toward second connector end 106. Connector 102 also includes a first annular connector segment 116 that extends longitudinally between first radial surface 112 and first connector end 104, and a second annular connector segment 118 that extends longitudinally between second radial surface 114 and second connector end 106. Provided along first connector segment 116 and second connector segment 118 are conventional external screw threads extending circumferentially along respective outer surfaces 120 and 122. First connector segment 116 threadably connects to a gland nut 124 at first connector end 104. Second connector segment 118 threadably connects to a wall 126 of an enclosure, such as a metal electrical panel or junction box. As shown in FIG. 1, when second connector segment 118 is threadably connected to wall 126, a crevice 128 is defined between an external surface 160 of wall 126 and second radial surface 114 of shoulder 110. External threads formed along outer surface 122 of second connector segment 118 may remain exposed by crevice 128.

A metallic ground cone 130 is positioned within central bore 108 at first connector end 104. Ground cone 130 has concentric annular walls 136 and 140 that are made integral by base surface 132. Base surface 132 is located near or adjacent an internal shelf 134 formed inside central bore 108. Each annular wall 136 and 140 terminates with a radially extending lip 138 and 142, respectively. Lip 138 of wall 136 may have a helical orientation. Lip 142 engages first connector end 104 to prevent longitudinal movement of ground cone 130 along axis 101 when a conduit 162 (shown in FIG. 4) is inserted into first connector end 104. Annular wall 136 extends within annular wall 140 and is spaced radially inward from annular wall 140 to define an annular pocket 144. In use, annular pocket 144 receives a terminal end of conduit 162 when conduit 162 is inserted into first connector end 104. Lip 138 of annular wall 136 may frictionally engage an interior surface of conduit 162 to form a liquid-tight connection between ground cone 130 and conduit 162. In other embodiments, annular wall 136 may include alternative or additional features formed thereon to provide frictional engagement between annular wall 136 and conduit 162.

Gland nut 124 includes a tail end 146 and head end 148 that are joined by a gland nut wall that includes a threaded portion along the interior of the wall. Gland nut 124 is threadably secured to connector 102 at first connector end 104. Head end 148 projects in a radially inward direction toward axis 101 and has an internal surface (not shown) directed toward first connector end 104 when gland nut 124 is secured to first connector segment 116.

Liquid-tight fitting 100 also includes a gasket 150 at first connector end 104. Gasket 150 surrounds lip 138 of annular wall 136. Gasket 150 has a generally O-shaped body and may be formed of a flexible material. Gasket 150 is compressed when gland nut 124 is secured to first connector segment 116 and sealingly engages first connector end 104 and the interior surface of head end 148 of gland nut 124. The flexible properties of gasket 150 also allow the gasket 150 to compressively fill a space between first connector end 104 and interior surface of head end 148 of gland nut 124 when gland nut 124 is secured to first connector segment 116.

In the exemplary embodiment, insulating sleeve 152 is inserted within central bore 108 at second connector end 106. Insulating sleeve 152 has a first sleeve end 154 that is flush with or extends slightly beyond second connector end 106 and a second sleeve end 156 that terminates proximate shelf 134. In other embodiments, liquid-tight fitting 100 does not include insulating sleeve 152.

Connector 102, ground cone 130, and gland nut 124 may all be formed of conductive metal so that electrical continuity is established between metallic conduit 162 and the body of connector 102 as well as the wall 126 of the enclosure to which the second connector segment 118 is secured. While metallic components are preferably shown so as to terminate a metallic conduit, the present invention also contemplates the termination of a non-metallic electrical conduit. Gasket 150 and sleeve 152 may each be made of electrically-insulative material so as to provide protection for electrical conductors (not shown) extending outwardly along axis 101 from respective first connector end 104 and second connector end 106.

As shown in FIG. 1, in order to achieve the desired seal between gland nut 124 and first connector end 104, the compressed gasket 150 prevents gland nut 124 from being fully tightened onto first connector segment 116. As a result, a space 158 is defined between tail end 146 of gland nut 124 and first radial surface 112 of shoulder 110. External threads formed along outer surface 120 of first connector segment 116 are exposed by space 158.

The presence of exposed external threads formed along respective outer surfaces 122 and 120 of connector segments 118 and 116, and associated space 158 and crevice 128 limits the useability of liquid-tight fitting 100. The fitting cannot be used in certain manufacturing environments that require a high level of cleanliness. For example, in the pharmaceutical and food and beverage industries, standards such as NSF 169 and EN 1672-2 restrict the types of liquid-tight fittings that may be used in areas in proximity to production equipment used to produce the end product. These standards impose strict hygienic design requirements defining liquid-tight fittings appropriate for use. The exposed threads on liquid-tight fitting 100 are difficult to sanitize and as a result can attract and enable harmful microbes and other contaminants to collect along the threaded surfaces and small crevices. This problem may be exacerbated in splash-zone and wash-down areas proximate production equipment, where liquid-tight fitting 100 would be frequently contacted, for example, by water and product and any collected contaminants entrained with water or product. As a result, prior art liquid-tight fitting 100 typically does not meet the strict sanitary/hygienic requirements for use and is not suitable for use in sanitary production areas.

Figure 2:
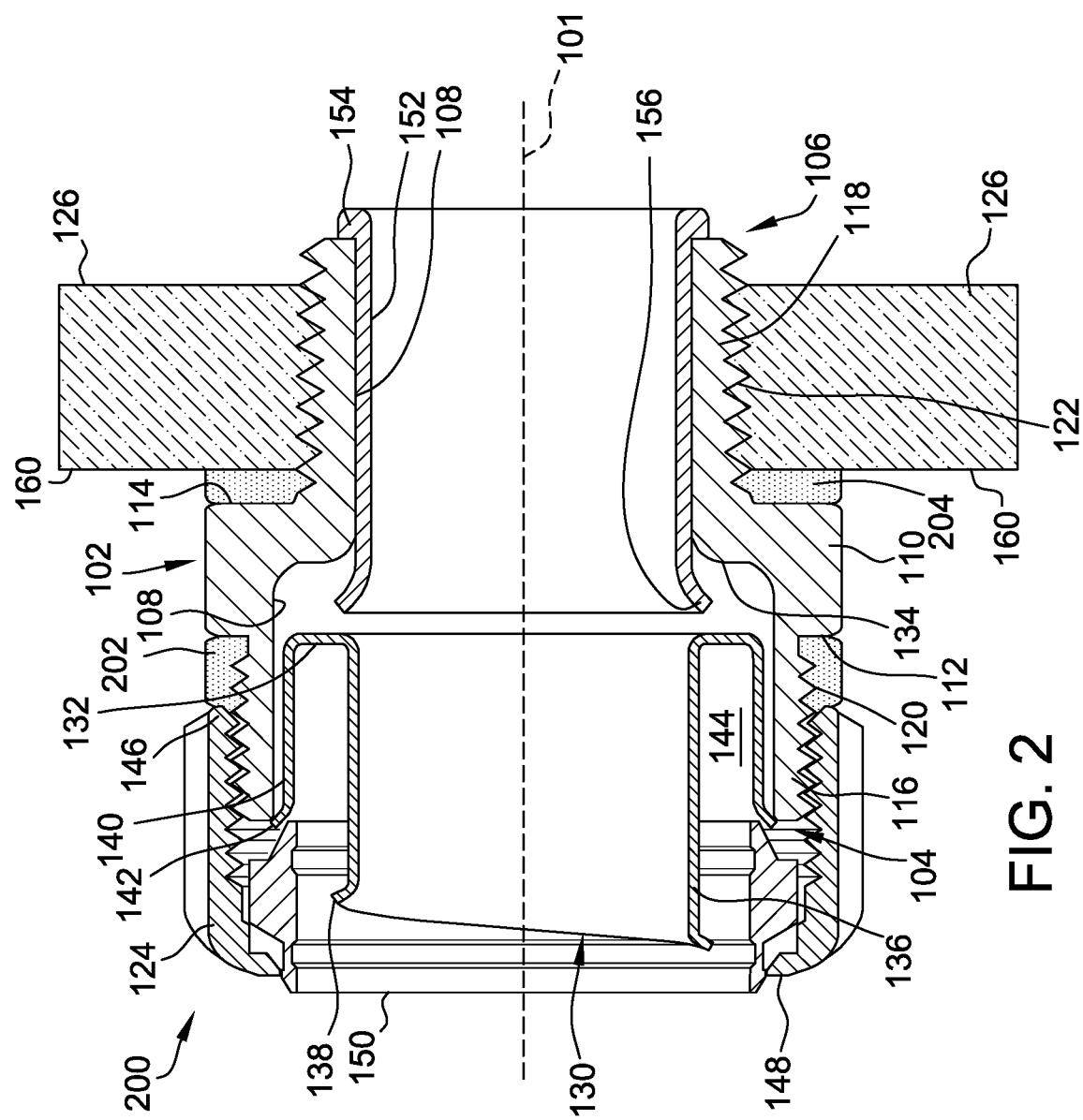
FIG. 2 is a longitudinal cross-sectional view of an exemplary liquid-tight fitting for use in a hygienic environment.
Figure 3:
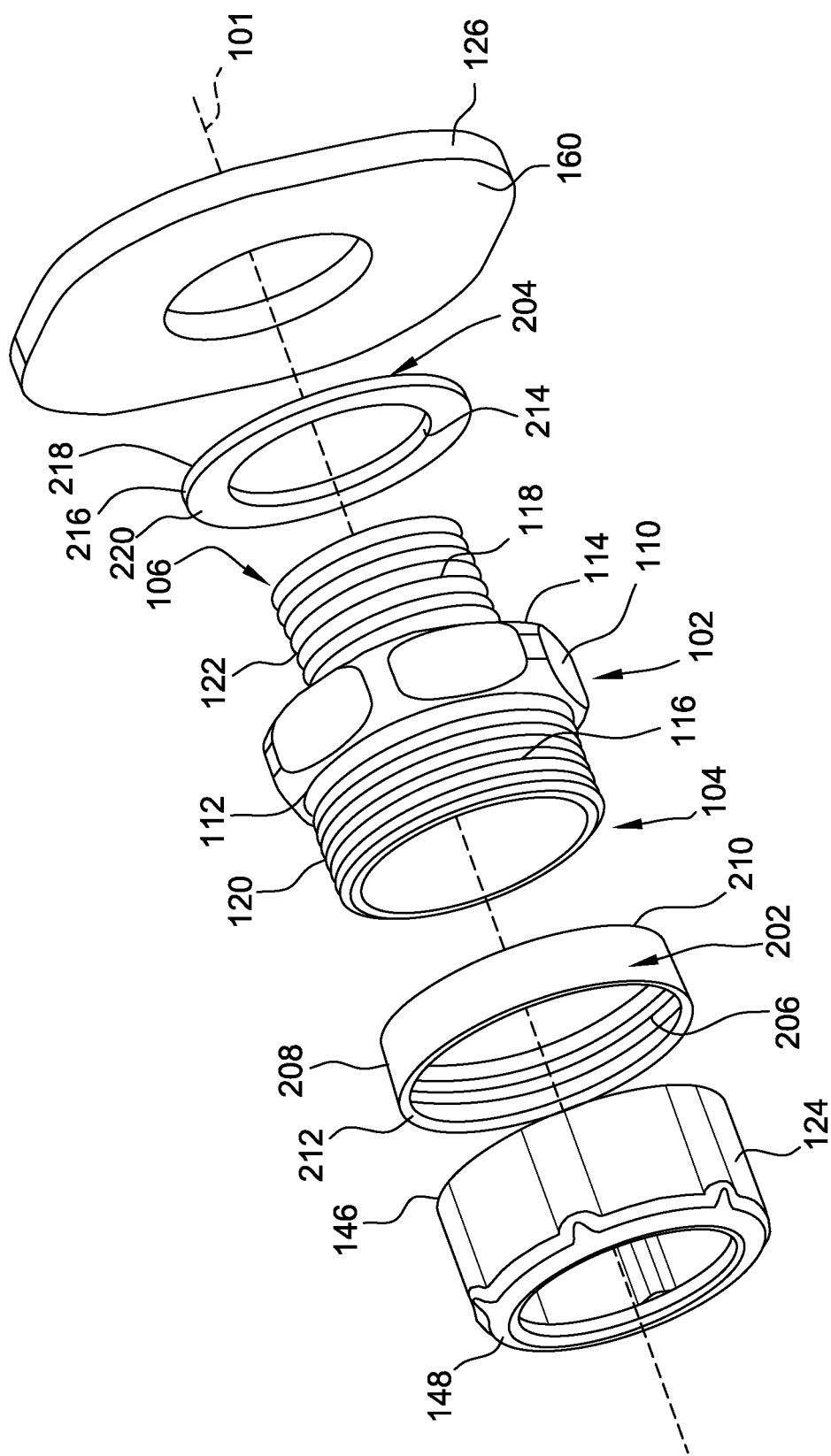
FIG. 3 is an exploded view of the liquid-tight fitting shown in FIG. 2.

Accordingly, referring now to FIGS. 2 and 3, an exemplary liquid-tight fitting 200 suitable for use as a hygienic liquid-tight fitting 200 in splash-zone and wash-down environments is shown. Liquid-tight fitting 200 includes all the elements and components described above for liquid-tight fitting 100 shown in FIG. 1. In addition, liquid-tight fitting 200 includes a first annular member 202 surrounding a portion of first connector segment 116 adjacent first radial surface 112 of shoulder 110 and a second annular member 204 surrounding a portion of second connector segment 118 adjacent second radial surface 114. In particular, as shown in FIG. 2, first annular member 202 is positioned between first radial surface 112 of shoulder 110 and tail end 146 of gland nut 124 to fill space 158 (shown in FIG. 1). Second annular member 204 is positioned between second radial surface 114 of shoulder 110 and external surface 160 of wall 126 to fill crevice 128 (shown in FIG. 1). Both first and second annular members 202 and 204 are made from an elastically deformable material. For example, first and second annular members 202 and 204 may each be made from a plastic or rubber material. Non-limiting examples of plastic materials suitable for use as first and second annular members 202 and 204 include polypropylene (PP), high-density polyethylene (HDPE), and polyamide (i.e., nylon). Non-liming examples of rubber materials for use as first and second annular members 202 and 204 include thermoplastic elastomers (TPE), such as, for example, thermoplastic vulcanizates (TPV), thermoplastic polyurethanes (TPU), thermoplastic co-polyesters (TPC), or styrenic block copolymers (SBC). The elastically deformable material used to make first annular member 202 may be different from the elastically deformable material used to make second annular member 204.

First annular member 202 has an inner surface 206 and an outer edge 208 opposite inner surface 206. Inner surface 206 and outer edge 208 are joined by first and second sidewalls 210 and 212. First sidewall 210 is oriented adjacent first radial surface 112 of shoulder 110 and second sidewall 212 is oriented adjacent tail end 146 of gland nut 124. Inner surface 206 contacts outer surface 120 of first connector segment 116 when first annular member 202 surrounds first connector segment 116. Second annular member 204 has an inner surface 214 and an outer edge 216 opposite inner surface 214. Inner surface 214 and outer edge 216 are joined by first and second sidewalls 218 and 220. First sidewall 218 is oriented adjacent external surface 160 of wall 126 and second sidewall 220 is oriented adjacent second radial surface 114 of shoulder 110. Inner surface 214 contacts outer surface 122 of second connector segment 118 when second annular member 204 surrounds second connector segment 118.

Figure 4:
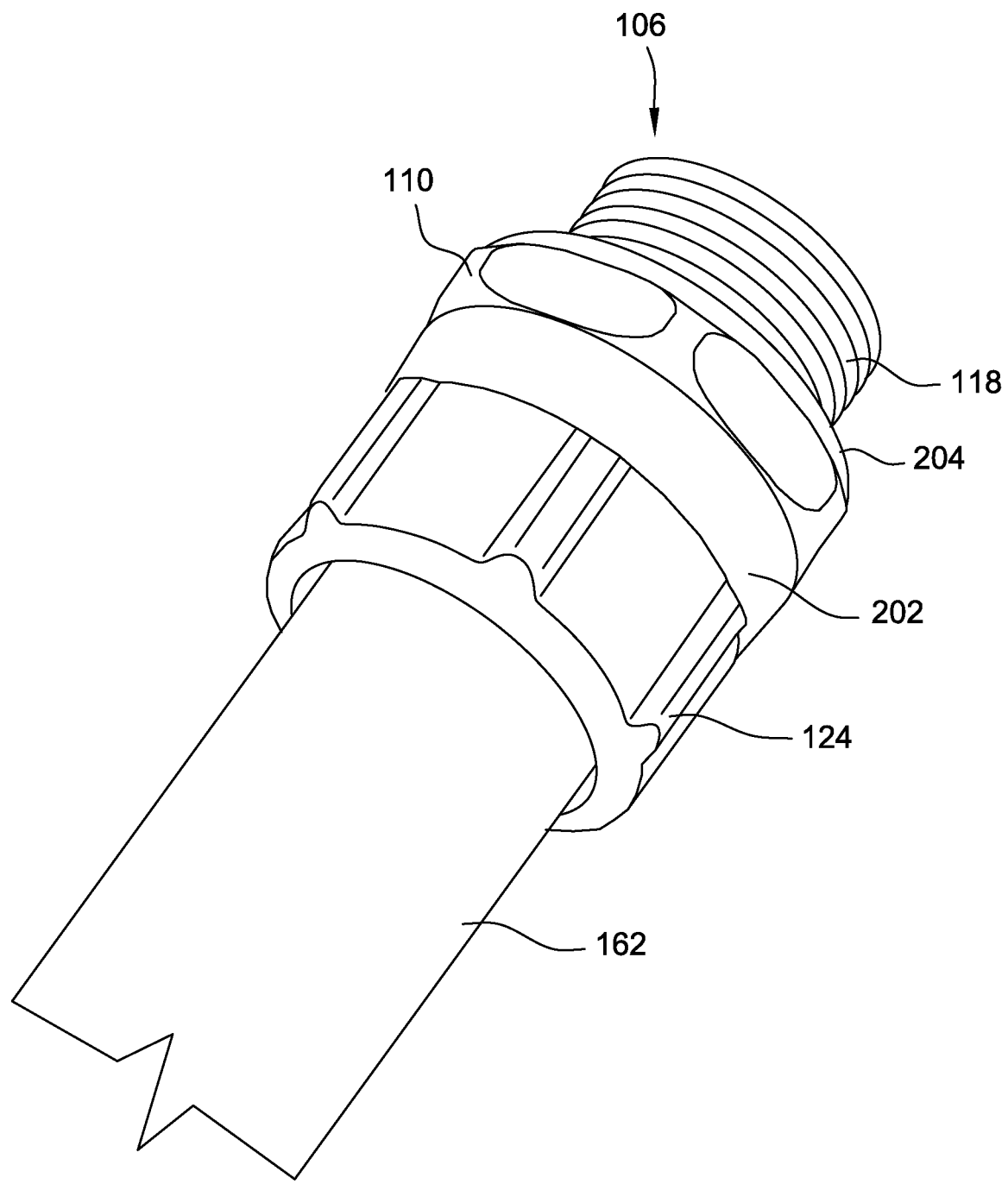
FIG. 4 is a perspective view of the liquid-tight fitting shown in FIG. 2, assembled with an electrical conduit.

When gland nut 124 is moveably secured to first connector end 104, tail end 146 of gland nut 124 contacts second sidewall 212 of first annular member 202. The elastically deformable first annular member 202 is compressed between tail end 146 and first radial surface 112 of shoulder 110 and forms a compressive seal therebetween. The compressive seal formed by first annular member 202 thereby prevents an ingress of unwanted contaminants, such as liquid from production equipment or a wash-down operation, into space 158 formed between tail end 146 and first radial surface 112. Similarly, when second connector segment 118 is threadably connected to wall 126, the elastically deformable second annular member 204 is compressed between second radial surface 114 of shoulder 110 and external surface 160 of wall 126 and forms a compressive seal therebetween. The compressive seal formed by second annular member 204 thereby prevents an ingress of unwanted contaminants, such as liquid from production equipment or a wash-down operation, into crevice 128 formed between second radial surface 114 and external surface 160. As a result of the compressive seals formed by first annular member 202 and second annular member 204, liquid-tight fitting 200 may be suitable for use as a hygienic liquid-tight fitting 200 in splash-zone and wash-down environments. FIG. 4 shows an assembled liquid-tight fitting 200 connected to a liquid-tight conduit 162 for coupling conduit 162 to wall 126 (shown in FIGS. 2 and 3) of an electrical enclosure in such environments.

In use, as gland nut 124 is progressively tightened onto first connector segment 116, the continued force exerted by tail end 146 onto second sidewall 212 and/or by first radial surface 112 onto first sidewall 210 may cause radially outward displacement of outer edge 208 of first annular member 202. Thus, to prevent first annular member 202 from popping out of space 158, first annular member 202 is sized and shaped such that compression of first annular member 202 between tail end 146 and first radial surface 112 causes first annular member 202 to generally deform radially inward toward axis 101. In addition, as second connector segment 118 is progressively tightened onto wall 126, the continued force exerted by external surface 160 onto first sidewall 218 and/or by second radial surface 114 onto second sidewall 220 may cause radially outward displacement of outer edge 216 of second annular member 204. Thus, to prevent second annular member 202 from popping out of crevice 128, second annular member 204 is sized and shaped such that compression of second annular member 204 between second radial surface 114 and external surface 160 causes second annular member 202 to generally deform radially inward toward axis 101.

Figure 5:
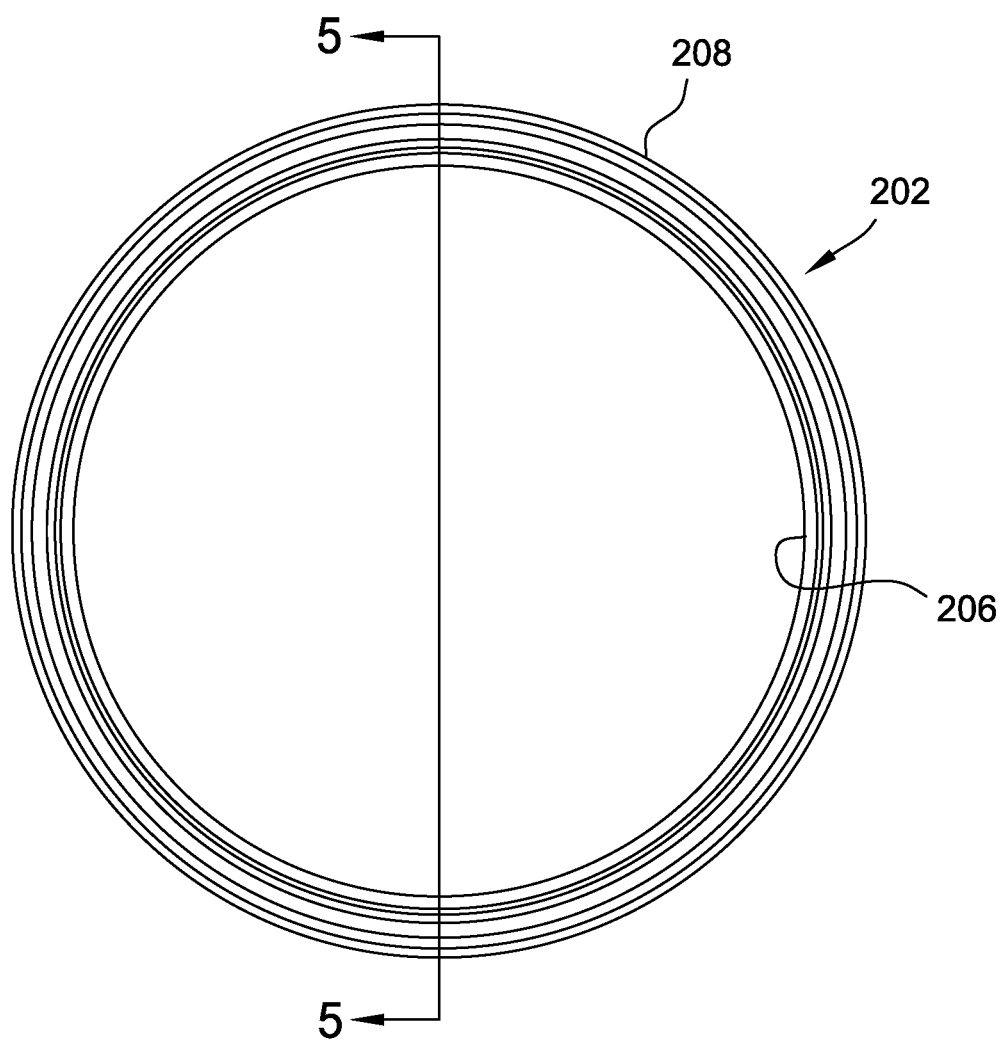
FIG. 5 is an isolated front view of an exemplary first annular member for converting the liquid-tight fitting shown in FIG. 1 to the liquid-tight fitting shown in FIG. 2 for use in a hygienic environment.

FIG. 5 shows an isolated front view of first annular member 202. In the exemplary embodiment, inner surface 206 of first annular member 202 defines an inner diameter D1 that is suitably dimensioned to enable inner surface 206 to contact outer surface 120 of first connector segment 116 and hold first annular member 202 in place when first annular member 202 is positioned around first connector segment 116. Inner diameter D1 is determined by a thread size of first connector segment 116. The thread size of first connector segment 116 is determined by an inner diameter of first connector end 104 which is suitably dimensioned to receive conduit 162. The inner diameter D1 of first annular member 202 is therefore not intended to be limited to any particular size, and first annular member 202 is contemplated to be used with liquid-tight fittings 200 of various sizes.

Figure 6:
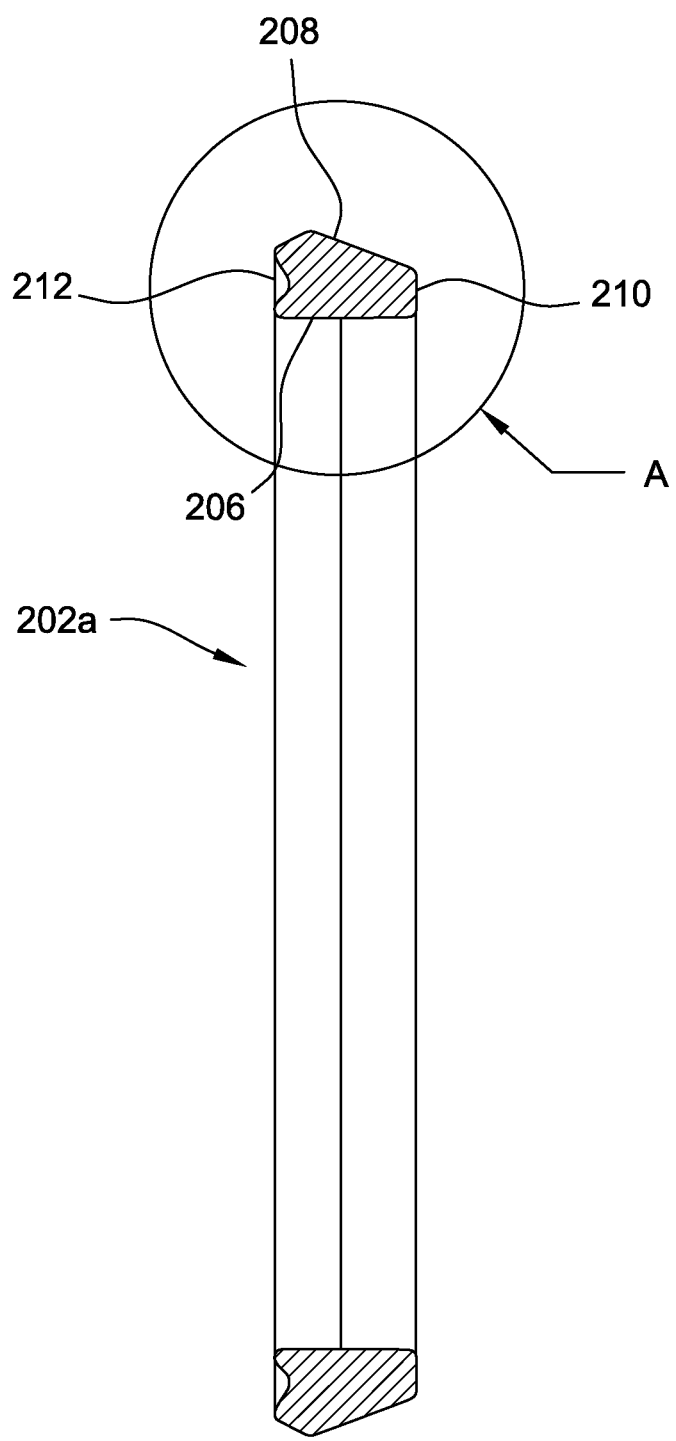
FIG. 6 is a cross-sectional view of a first embodiment of the exemplary first annular member shown in FIG. 5, taken along line 5-5.
Figure 7:
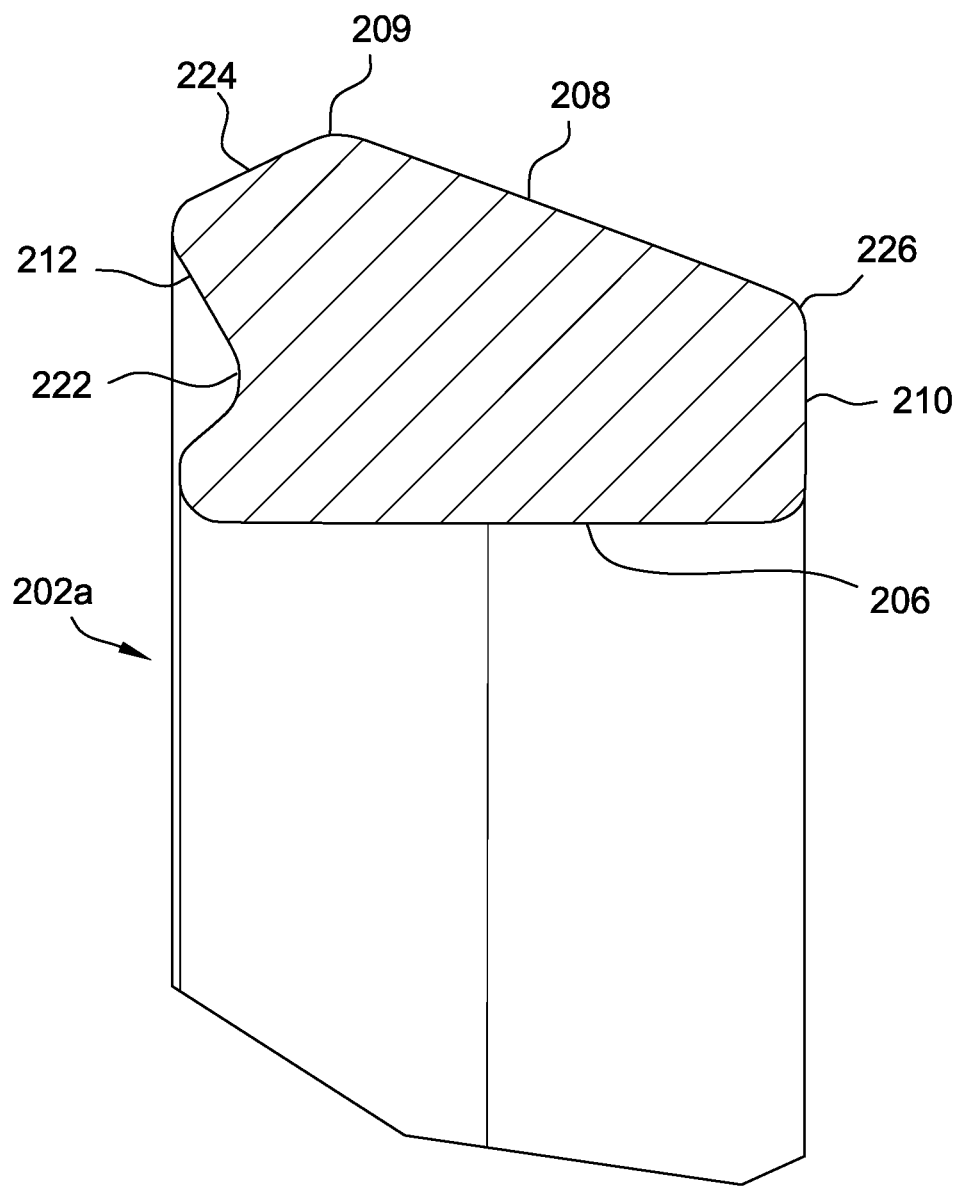
FIG. 7 is a magnified cross-sectional view of the portion indicated by the section circle A in FIG. 6.

FIG. 6 shows a cross-sectional view of a first example embodiment of first annular member 202, designated as first annular member 202a, taken along line 5-5 shown in FIG. 5. As shown in FIG. 6, first annular member 202a has a generally rectangular cross-section defined by inner surface 206, outer edge 208, first sidewall 210, and second sidewall 212. The cross-section is the same along the entire first annular member 202a. FIG. 7 shows a magnified view of section portion A shown in FIG. 6, and illustrates in detail additional features of the cross-section of first annular member 202a. As shown in FIG. 7, inner surface 206 of first annular member 202a is substantially planar as inner surface 206 extends between first and second sidewalls 210 and 212. In other embodiments, inner surface 206 may be a non-planar surface, for example, inner surface 206 may be a convex surface or concave surface. Inner surface 206 has a length between first and second sidewalls 210 and 212 that is greater than the longitudinal dimension of space 158 (shown in FIG. 1). An annularly extending notch 222 is formed in second sidewall 212. Notch 222 is dimensioned to match a contoured surface of tail end 146 of gland nut 124 that engages second sidewall 212, such that tail end 146 sealingly engages second sidewall 212. A chamfered edge 224 is formed at the intersection of second sidewall 212 and outer edge 208, adjacent notch 222. Chamfered edge 224 reduces a thickness of first annular member 202a between inner surface 206 and outer edge 208 at second sidewall 212. The thickness at second sidewall 212 prevents the elastically deformable material of first annular member 202a at second sidewall 212 from substantially protruding outward beyond an outer surface of tail end 146 when first annular member 202a is compressed. A radius edge 226 is formed at the intersection of first sidewall 210 and outer edge 208, opposite chamfered edge 224. A portion of outer edge 208 is angled inwardly toward inner surface 206 from chamfered edge 224 to radius edge 226, such that an apex 209 is defined on outer edge 208. A thickness of first annular member 202a between inner surface 206 and outer edge 208 is reduced at first sidewall 210 relative to a thickness at apex 209. The thickness at first sidewall 210 prevents the elastically deformable material of first annular member 202a at first sidewall 210 from substantially protruding outward beyond an outer surface of shoulder 110 when first annular member 202a is compressed. Chamfered edge 224 may extend a distance between second sidewall 212 and apex 209 that is greater than, less than, or equal to a distance that the portion of outer edge 208 between apex 209 and radius edge 226 extends. Accordingly, apex 209 may be located proximate second sidewall 212, proximate first sidewall 210, or an equal distance from first and second sidewalls 210 and 212. The chamfered edge 304, radius edge 306, and/or thickness of first and second sidewalls 210 and 212 suitably allow first annular member 202a to form a compressive seal between gland nut 124 and shoulder 110 and allow the elastically deformable material of first annular member 202a to move in a radial inward direction toward axis 101 when compressed.

Referring now to FIGS. 8-13, various alternative embodiments of first annular member 202 are shown and described in further detail herein. These various embodiments include cross-section features that are in addition and/or alternative to the cross-section features of first annular member 202a shown in magnified view in FIG. 7. Each of FIGS. 8-13 shows, for each respective alternative embodiment, a magnified view of a portion of the cross-section of first annular member 202 taken along line 5-5 (shown in FIG. 5) that is similar to section portion A of first annular member 202a shown in FIG. 6. For each embodiment, the cross-section is the same along the entire first annular member 202 unless specifically described otherwise.

The additional and/or alternative cross-section features of each embodiment of first annular member 202 are suitable to enable first annular member 202 to function as described herein for various sizes of liquid-tight fittings 200. As is known in the art, features of liquid-tight fitting 200 are not necessarily uniform across all sizes and/or shapes of liquid-tight fittings 200 for use as described herein. For example, a height of shoulder 110 relative to axis 101 may increase or decrease based on a size and/or shape of connector 102. As the height of shoulder 110 changes, so does the height of first radial surface 112. The thickness of first annular member 202 at first sidewall 210 may therefore be adjusted depending on a size of connector 102 with which first annular member 202 is intended to be used, to facilitate suitable deformation characteristics when first annular member 202 is compressed as described herein. In addition, a shape of inner surface 206 may be adjusted based on a height of shoulder 110. For example, in some embodiments, shoulder 110 may have a small enough height that it restricts the amount of surface area of first radial surface 112 that is available to contact first sidewall 210 and facilitate compression of first annular member 202. In these embodiments, inner surface 206 may have a generally concave shape, and inner surface 206 may have a greater radially-inward extension at first sidewall 210, relative to second sidewall 212, to increase an amount of surface area of first sidewall 210 that can contact the relatively small amount of available surface area of first radial surface 112. The height of tail end 146 of gland nut 124 relative to axis 101, and contours of the surface of tail end 146 that engages second sidewall 212, also may vary according to the size of gland nut 124 to be used, which is determined by the size of connector 102. The thickness of first annular member 202 at second sidewall 212, and a contoured profile of second sidewall 212 (e.g., a radius of notch 222) to suitably match that of tail end 146 of gland nut 124, may therefore also be adjusted to facilitate suitable deformation characteristics as described herein.

Figure 8:
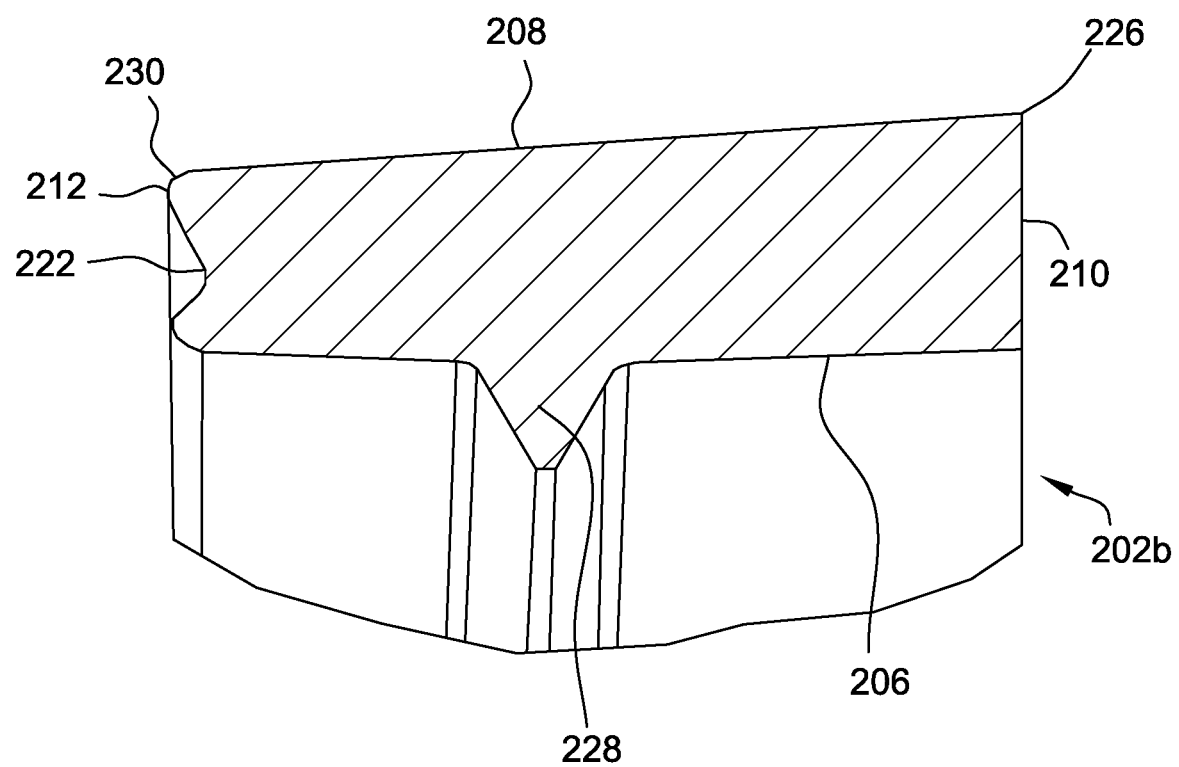
FIGS. 8-13 show magnified partial cross-sectional views of various alternative embodiments of the exemplary first annular member shown in FIG. 5, taken along line 5-5.

A first alternative embodiment of first annular member 202, designated as first annular member 202b, is shown in magnified cross-sectional view in FIG. 8. First annular member 202b may be intended for use with liquid-tight fitting 200 that includes connector 102 having a 1 ¼-inch inner diameter at first connector end 104. In this embodiment, inner surface 206 includes a radially-inward directed projection 228 formed thereon that extends circumferentially along inner surface 206. Projection 228 has a V-shaped cross-section and is sized and shaped to fit within a crevice formed by the external threads along outer surface 120 of first connector segment 116. Projection 228 extends circumferentially in off-set manner to match the circumferentially-extending path of the crevice formed by the external threads on outer surface 120. In this respect, at any cross-section of first annular member 202b, the position of projection 228 on inner surface 206 changes. Inner surface 206 is also slightly convex in shape, curving upward toward outer edge 208 as inner surface 206 extends from projection 228 to each sidewall 210 and 212. First annular member 202b also includes notch 222 formed in second sidewall 212 which is suitably dimensioned as described above for first annular member 202a. A radius edge 230 is formed at the intersection of outer edge 208 and second sidewall 212, opposite radius edge 226. Outer edge 208 is angled inwardly toward inner surface 206 from radius edge 226 to radius edge 230, such that a thickness of first annular member 202b between inner surface 206 and outer edge 208 is increased at first sidewall 210 relative to a thickness at second sidewall 212.

Figure 9:
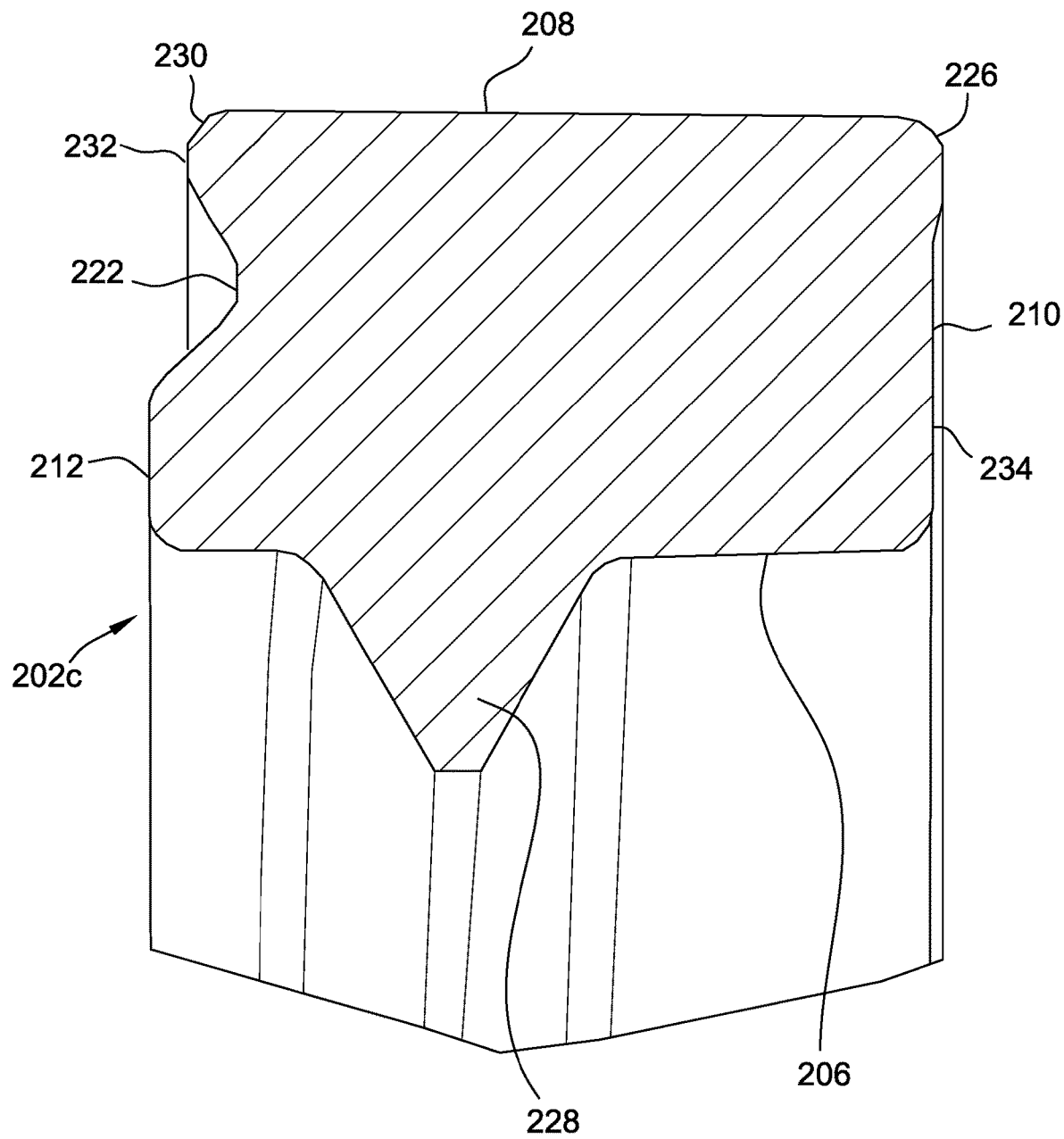

A second alternative embodiment of first annular member 202, designated as first annular member 202c, is shown in magnified cross-sectional view in FIG. 9. First annular member 202c may be intended for use with liquid-tight fitting 200 that includes connector 102 having a 1 ½-inch inner diameter at first connector end 104. First annular member 202c includes the same features and elements of first annular member 202b (shown in FIG. 8), with suitable dimensions for the alternatively sized connector 102. In this embodiment, outer edge 208 is angled inwardly toward inner surface 206 from radius edge 230 to radius edge 226, such that a thickness of first annular member 202b between inner surface 206 and outer edge 208 is reduced at first sidewall 210 relative to a thickness at second sidewall 212. Additionally, in this embodiment, second sidewall 212 is recessed at a portion 232 proximate radius edge 230, and first sidewall 210 is recessed at a portion 234 adjacent inner surface 206.

Figure 10:
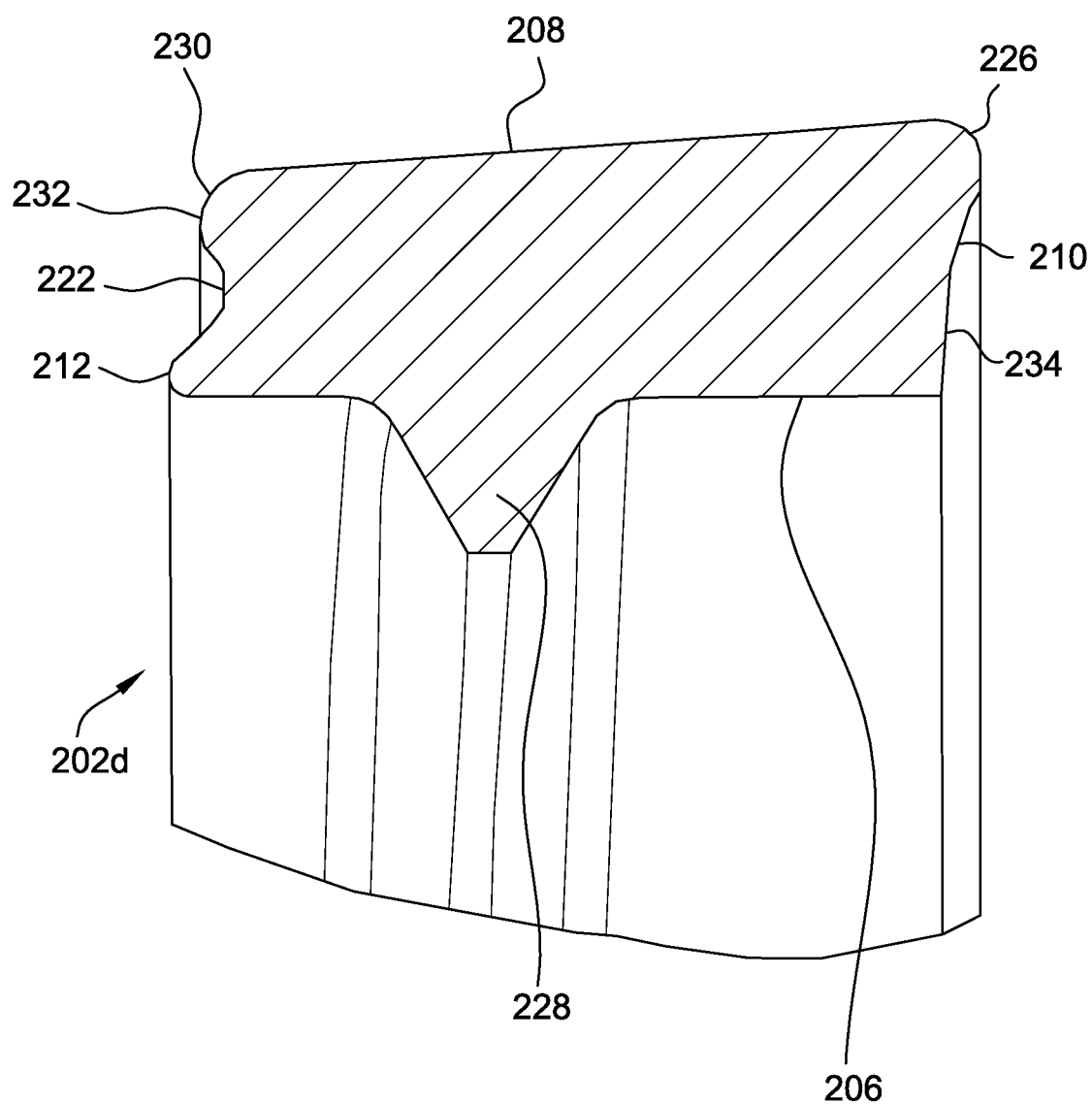
Figure 11:
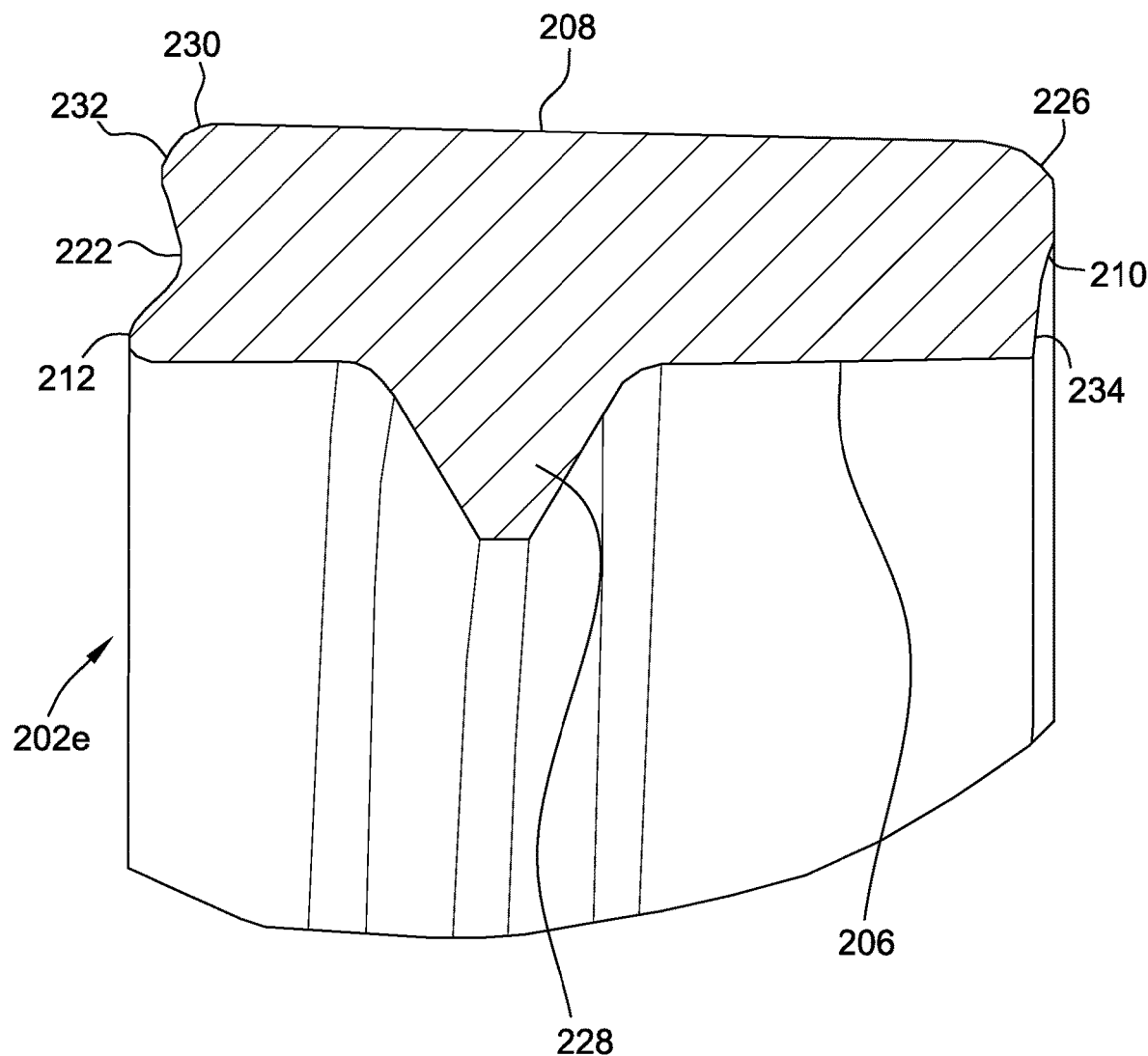
Figure 12:
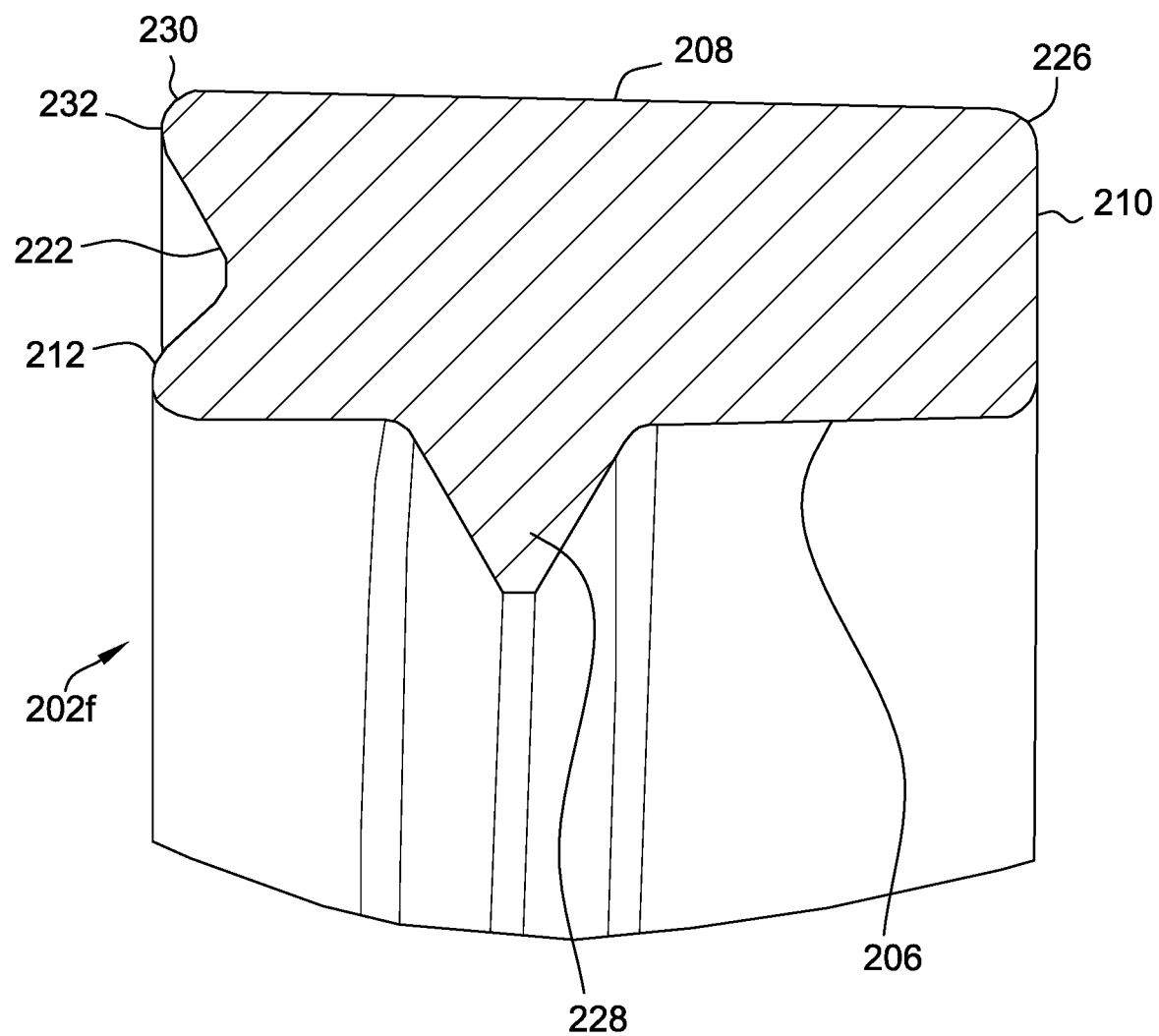
Figure 13:
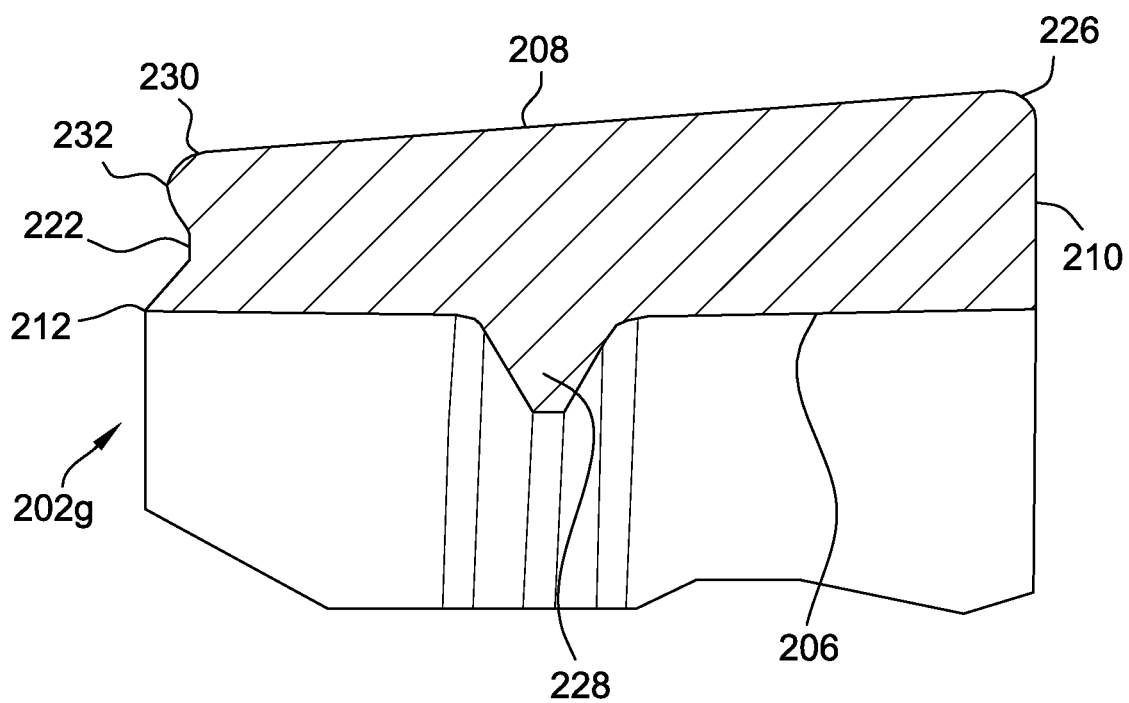

A third alternative embodiment of first annular member 202, designated as first annular member 202d, is shown in magnified cross-sectional view in FIG. 10. First annular member 202d may be intended for use with liquid-tight fitting 200 that includes connector 102 having a ¾-inch inner diameter at first connector end 104. First annular member 202d includes the same features and elements of first annular member 202c (shown in FIG. 9), with suitable dimensions for the alternatively sized connector 102. In this embodiment, outer edge 208 is angled inwardly toward inner surface 206 from radius edge 226 to radius edge 230, such that a thickness of first annular member 202b between inner surface 206 and outer edge 208 is increased at first sidewall 210 relative to a thickness at second sidewall 212. A fourth alternative embodiment of first annular member 202, designated as first annular member 202e, is shown in magnified cross-sectional view in FIG. 11. First annular member 202e may be intended for use with liquid-tight fitting 200 that includes connector 102 having a ½-inch inner diameter at first connector end 104. First annular member 202e includes the same features and elements of first annular member 202c (shown in FIG. 9), with suitable dimensions for the alternatively sized connector 102. A fifth alternative embodiment of first annular member 202, designated as first annular member 202f, is shown in magnified cross-sectional view in FIG. 12. First annular member 202f may be intended for use with liquid-tight fitting 200 that includes connector 102 having a 2-inch inner diameter at first connector end 104. First annular member 202f includes the same features and elements of first annular member 202c (shown in FIG. 9), with suitable dimensions for the alternatively sized connector 102. First annular member 202f also has a first sidewall 210 that does not include a recessed portion. A sixth alternative embodiment of first annular member 202, designated as first annular member 202g, is shown in magnified cross-sectional view in FIG. 13. First annular member 202g may be intended for use with liquid-tight fitting 200 that includes connector 102 having a 1-inch inner diameter at first connector end 104. First annular member 202g includes the same features and elements of first annular member 202d (shown in FIG. 10), with suitable dimensions for the alternatively sized connector 102. First annular member 202g also has a first sidewall 210 that does not include a recessed portion.

Figure 14:
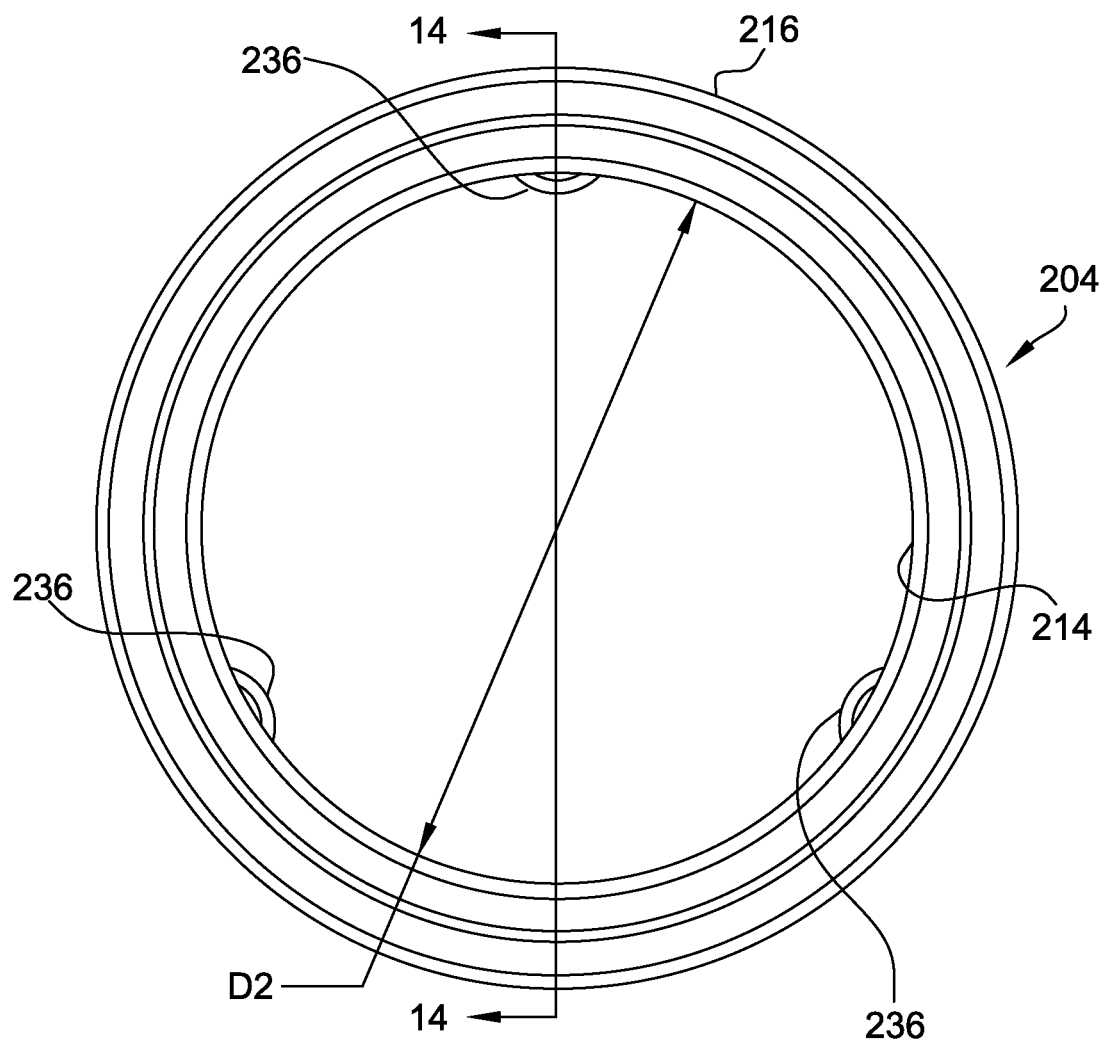
FIG. 14 is an isolated front view of an exemplary second annular member for converting the liquid-tight fitting shown in FIG. 1 to the liquid-tight fitting shown in FIG. 2 for use in a hygienic environment.

Referring now to FIG. 14, an isolated front view of second annular member 204 is shown. In the exemplary embodiment, inner surface 214 of second annular member 204 defines an inner diameter D2 that is suitably dimensioned to enable inner surface 214 to contact outer surface 122 of second connector segment 118 and hold second annular member 204 in place when second annular member 204 is positioned along second connector segment 118. The length of inner diameter D2 is determined by a thread size of second connector segment 118 which is suitably dimensioned to secure connector 102 to wall 126. The inner diameter D2 of second annular member 204 is therefore not intended to be limited to any particular size, and second annular member 204 is contemplated to be used with liquid-tight fittings 200 of various sizes. Inner surface 214 also includes a set of circumferentially-spaced ribs 236 that project in a radially-inward direction. Ribs 236 may engage and grip threads formed along outer surface 122 of second connector segment 118 and prevent longitudinal movement of second annular member 204 along axis 101 when second annular member 204 is positioned around second connector segment 118. In the exemplary embodiment, inner surface 214 includes three ribs 236 that are circumferentially-spaced equal distances along inner surface 214. In other embodiments, more or fewer ribs 236 than the three ribs disclosed may be formed on inner surface 214, and may be spaced in any suitable manner to provide the function described herein.

Figure 15:
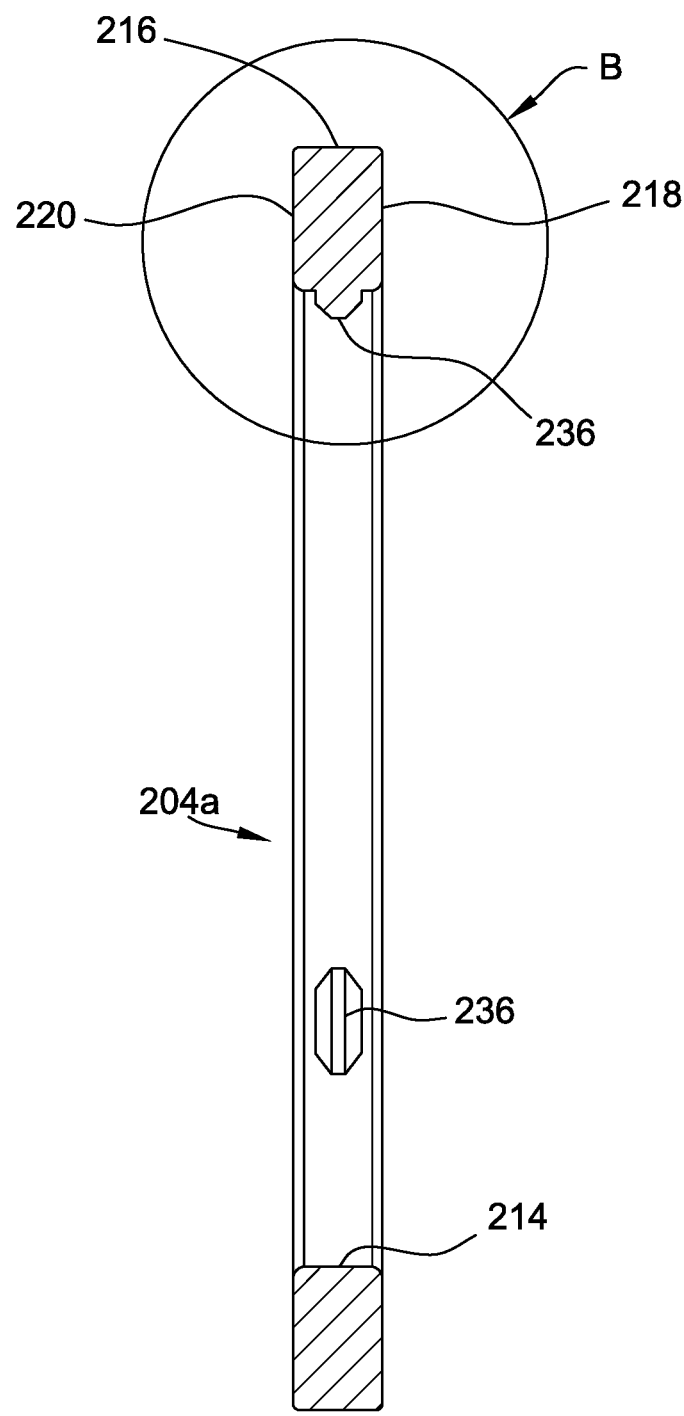
FIG. 15 is a cross-sectional view of a first embodiment of the exemplary second annular member shown in FIG. 14, taken along line 14-14.
Figure 16:
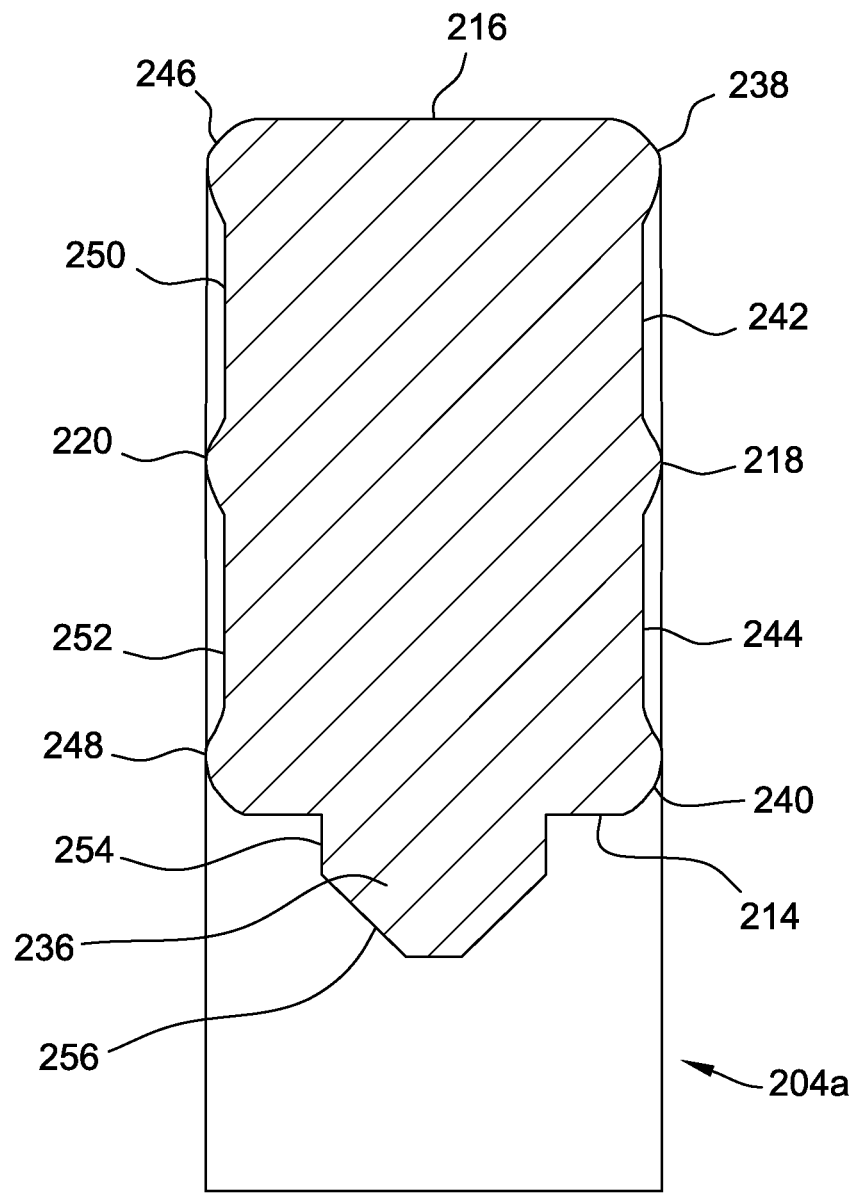
FIG. 16 is a magnified cross-sectional view of the portion indicated by the section circle B in FIG. 15.

FIG. 15 shows a cross-sectional view of a first example embodiment of second annular member 204, designated as second annular member 204a, taken along line 14-14 shown in FIG. 14. As shown in FIG. 15, second annular member 204a has a generally rectangular cross-section defined by inner surface 214, outer edge 216, first sidewall 218, and second sidewall 220. The cross-section defined by outer edge 216 and first and second sidewalls 218 and 220 is the same along the entire second annular member 204a, and the cross-section defined by inner surface 214 is the same at portions where ribs 236 are formed and is the same at portions without ribs 236. FIG. 16 shows a magnified view of section portion B shown in FIG. 15, and illustrates in detail additional features of the cross-section of second annular member 204a at a portion where a rib 236 is formed on inner surface 214. As shown in FIG. 16, outer edge 216 of second annular member 204a is substantially planar. Inner surface 214 and outer edge 216 have a substantially equal length between first and second sidewalls 218 and 220. The length of inner surface 214 and outer edge 216 is suitably larger than the longitudinal dimension of crevice 128 (shown in FIG. 1). First sidewall 218 extends between a first radius edge 238, formed at the intersection of first sidewall 218 and outer edge 216, and a second radius edge 240, formed at the intersection of first sidewall 218 and inner surface 214. First sidewall 218 has a first recessed portion 242 proximate first radius edge 238 and a second recessed portion 244 proximate second radius edge 240. First and second recessed portions 242 and 244 extend between outward projecting portions of first sidewall 218. Second sidewall 220 extends between a first radius edge 246, formed at the intersection of second sidewall 218 and outer edge 216, and a second radius edge 248, formed at the intersection of second sidewall 220 and inner surface 214. Second sidewall 220 has a first recessed portion 250 proximate first radius edge 246 and a second recessed portion 252 proximate second radius edge 248. First and second recessed portions 250 and 252 extend between outward projecting portions of second sidewall 220. The outward projecting portions of first and second sidewalls 218 and 220 may engage and grip the respective second axial surface 114 and external surface 160 and prevent the elastically deformable material of second annular member 204a from substantially moving radially outward away from axis 101 when second annular member 204a is compressed. Rib 236 has a first portion 254 adjacent inner surface 214 that has a rectangular cross section, and a second portion 256 opposite inner surface 214 that has a V-shaped cross section. Second portion 256 is sized and shaped to fit within a crevice formed by the external threads along outer surface 122 of second connector segment 118.

Figure 17:
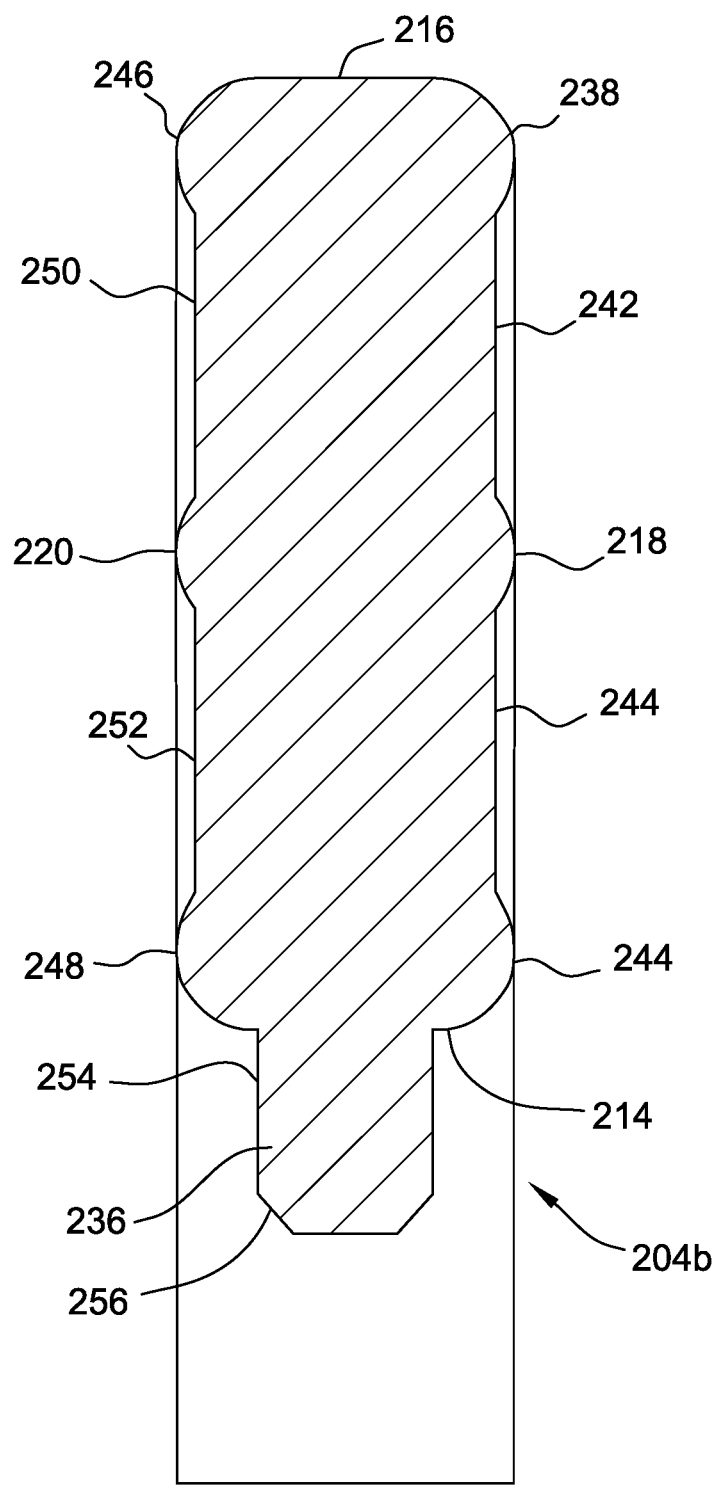
FIG. 17 is a magnified partial cross-sectional view of a second embodiment of the exemplary second annular member shown in FIG. 14, taken along line 14-14.

An alternative embodiment of second annular member 204, designated as second annular member 204b, is shown in magnified cross-sectional view in FIG. 17. FIG. 17 shows a magnified view of a portion of the cross-section of second annular member 204 taken along line 14-14 (shown in FIG. 14) that is similar to section portion B of first annular member 204a shown in FIG. 15. Second annular member 204b may be intended for use with liquid-tight fitting 200 that includes connector 102 having a different diameter at second connector end 106 than a liquid-tight fitting 200 with which second annular member 204a is intended for use. Second annular member 204b includes the same features and elements of second annular member 204a (shown in FIG. 16), with suitable dimensions for the alternatively sized connector 102.

Figure 18A:
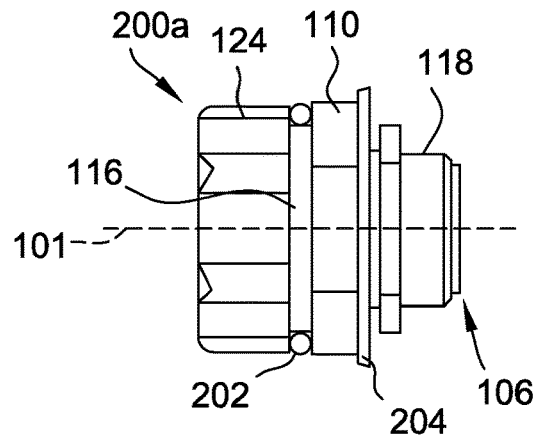
FIGS. 18a-18c are schematic illustrations of another exemplary liquid-tight fitting for use in a hygienic environment, having different shaped connectors.
Figure 18B:
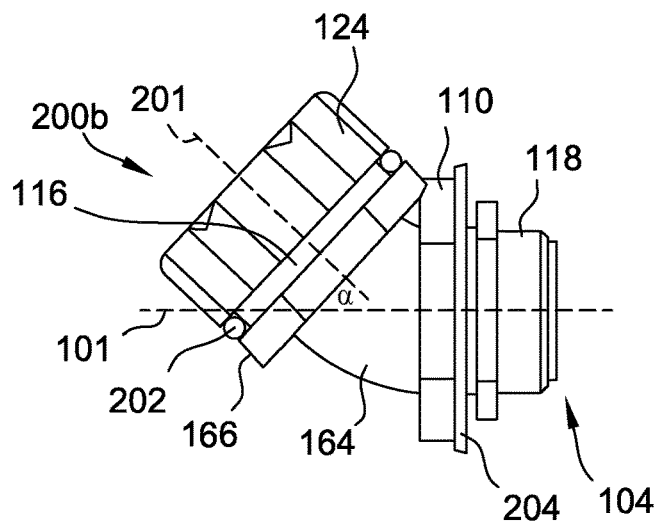
Figure 18C:
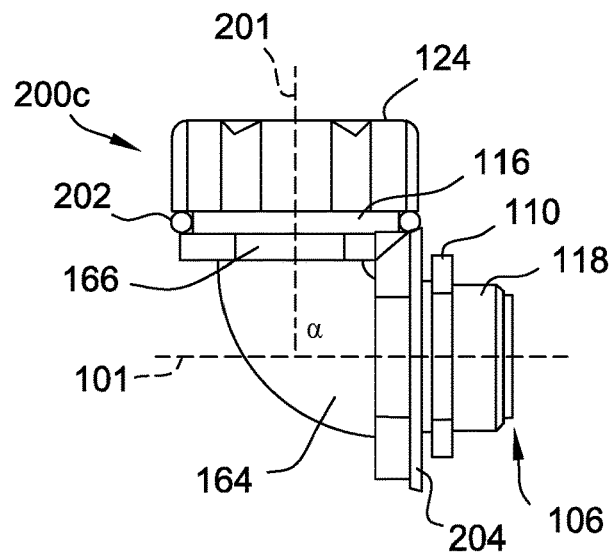

Referring now to FIGS. 18a-18c, schematic illustrations of alternating embodiments of liquid-tight fitting 200 are shown. As shown in FIG. 18a, in a first embodiment liquid-tight fitting 200a, connector 102 may have an axially aligned, straight body such that liquid-tight fitting 200a extends continuously along axis 101. In this embodiment, first annular member 202 and second annular member 204 are in axial alignment along axis 101. Alternatively, as shown in FIGS. 18b and 18c, connector 102 of liquid-tight fitting 200b and 200c, respectively, may include a central elbow portion 164 that separates the fitting and connector by an angle, α. Central elbow portion 164 extends between shoulder 110 and a second shoulder 166. Second shoulder 166 includes the same features described above for shoulder 110, and first annular member 202 compressively seals space 158 (shown in FIG. 1) between gland nut 124 and second shoulder 166 as described herein. Central elbow portion 164 is curved relative to axis 101 such that first connector end 104 (shown in FIG. 2) is axially off-set from second connector end 106. First connector end 104 is axially aligned along axis 201, which forms angle α with axis 101. As a result, first annular member 202 is axially off-set from second annular member 204 by angle α. For example, angle α may be about a 45° angle (as is the case for liquid-tight fitting 200b shown in FIG. 18b) or be about a 90° degree angle (as is the case for liquid-tight fitting 200c shown in FIG. 18c). In other embodiments, angle α may be any suitable angle of an elbow-shaped connector 102 known in the art, typically an angle between 0° and 90°.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A liquid-tight fitting comprising:
   a connector having a first end, a second end, a shoulder located between the first end and the second end, and a first segment extending from the shoulder to the first end, the first segment having an outer surface that includes external threads extending circumferentially along the outer surface;
   a first seal member formed of an elastically deformable material, the first seal member surrounding a portion of the first segment adjacent the shoulder, the first seal member having an inner surface in contact with the external threads of the first segment, an outer edge opposite the inner surface, and first and second seal ends joining the inner surface and the outer edge, wherein the first seal end abuts against the shoulder; and
   a fastener member threadably secured to the first end of the connector, the fastener member having an end,
   wherein the end of the fastener member contacts the second seal end such that the first seal member is compressed between the end of the fastener member and the shoulder, and deforms in a radially inward direction such that the inner surface of the first seal interfaces with the external threads of the first segment, and wherein the first seal member forms a liquid-tight compressive seal between the shoulder and the end of the fastener member.

2. The liquid-tight fitting of claim 1, wherein the connector further comprises a second segment extending from the shoulder to the second end, and wherein a second seal member surrounds a portion of the second segment adjacent the shoulder, the second seal member formed of an elastically deformable material.

3. The liquid-tight fitting of claim 1, wherein the fastener member is a gland nut having a threaded interior surface to secure the gland nut to the first end of the connector.

4. The liquid-tight fitting of claim 1, wherein the inner surface of the first seal is substantially planar.

5. The liquid-tight fitting of claim 1, wherein a projection is formed on the inner surface of the first seal member and extends circumferentially along the inner surface, the projection shaped to fit within a crevice of the external threads.

6. The liquid-tight fitting of claim 1, wherein the first seal member has a first sidewall defining the first seal end and a second sidewall defining the second seal end, and wherein a notch is formed in the second sidewall, the notch contoured to match a shape of the end of the fastener member.

7. The liquid-tight fitting of claim 6, wherein a chamfered edge is formed between the second sidewall and the outer edge.

8. The liquid-tight fitting of claim 7, wherein a radius edge is formed between the first sidewall and the outer edge.

9. The liquid-tight fitting of claim 8, wherein a thickness of the first seal member between the inner surface and the outer edge reduces as the outer edge extends from the chamfered edge to the radius edge, such that the thickness of the first seal member is reduced at the first sidewall relative to the thickness at the chamfered edge.

10. The liquid-tight fitting of claim 6, wherein a first radius edge is formed between the first sidewall and the outer edge and a second radius edge is formed between the second sidewall and the outer edge.

11. The liquid-tight fitting of claim 10, wherein a thickness of the first seal member between the inner surface and the outer edge reduces as the outer edge extends from the first radius edge to the second radius edge, such that the thickness of the first seal member is reduced at the second sidewall relative to the thickness at the first sidewall.

12. The liquid-tight fitting of claim 10, wherein a thickness of the first seal member between the inner surface and the outer edge reduces as the outer edge extends from the second radius edge to the first radius edge, such that the thickness of the first seal member is reduced at the first sidewall relative to the thickness at the second sidewall.

13. The liquid-tight fitting of claim 10, wherein the outer edge is substantially planar between the first radius edge and the second radius edge and a thickness of the first seal member between the inner surface and the outer edge is substantially continuous between the first sidewall and the second sidewall.

14. The liquid-tight fitting of claim 1, wherein the connector has a central bore extending from the first end to the second end, the liquid-tight fitting further comprising a ground cone positioned within the central bore at the first end of the connector, the ground cone connectable with a conduit.

15. The liquid-tight fitting of claim 14, wherein the connector further comprises a second segment extending from the shoulder to the second end, and wherein the second segment is configured to attach the connector to an electrical enclosure.

16. The liquid-tight fitting of claim 15, wherein a second seal member surrounds a portion of the second segment adjacent the shoulder, the second seal member formed of an elastically deformable material, the second seal member configured to form a liquid-tight compressive seal between the shoulder and the electrical enclosure.

17. A liquid-tight fitting comprising:
    a connector having a first end configured to receive a conduit, a second end configured to attach to an electrical enclosure, a central bore extending therethrough, a shoulder located between the first end and the second end, a first segment extending from the shoulder to the first end, and a second segment extending from the shoulder to the second end,
    wherein the first segment and the second segment of the connector have external threads extending circumferentially along the outer surface;
    a ground cone positioned within the central bore at the first end of the connector;
    a first seal member formed of an elastically deformable material, the first seal member surrounding a portion of the first segment adjacent the shoulder, the first seal member having an inner surface in contact with the external threads of the first segment, an outer edge opposite the inner surface, and first and second seal ends joining the inner surface and the outer edge, wherein the first seal end abuts against the shoulder;
    a gland nut threadably secured to the first end of the connector, the gland nut having an end that engages the second seal end of the first seal member to cause the first seal member to form a liquid-tight compressive seal between the shoulder and the gland nut, wherein the first seal member is configured to deform radially inward such that the inner surface of the first seal member interfaces with the external threads of the first segment when the end of the gland nut engages the second seal end of the first seal member; and
    a second seal member surrounding a portion of the second segment adjacent the shoulder, the second seal member formed of an elastically deformable material, the second seal member configured to form a liquid-tight compressive seal between the shoulder and the electrical enclosure, wherein the second seal member has an inner surface, and is configured to deform radially inward such that the inner surface of the second seal member engages with the external threads of the second segment when the second end is attached to the electrical enclosure.

18. A method for assembling a liquid-tight fitting, the method comprising:
provided a connector, the connector having a first end, a second end, a shoulder located between the first end and the second end, and a first segment extending from the shoulder to the first end,
wherein the first segment of the connector has external threads extending circumferentially along the outer surface;
placing a seal member around the first segment, the seal member having first and second seal ends joining an inner surface and an outer edge of the seal member, wherein the seal member is placed around the first segment so that the first seal end abuts against the shoulder and the inner surface is in contact with the first segment; and
moveably securing a fastener member to the first end of the connector such that an end of the fastener member contacts the second seal end to cause the seal member to form a compressive seal between the end of the fastener member and the shoulder, wherein the seal member deforms radially inward toward the first segment such that the inner surface of the seal member interfaces with the external threads of the first segment when the fastener member contacts the second seal end.

* * * * *